(12) United States Patent
Heo et al.

(10) Patent No.: US 12,020,407 B2
(45) Date of Patent: Jun. 25, 2024

(54) IMAGE DATA PROCESSING SYSTEM FOR VEHICLE

(71) Applicant: LX Semicon Co., Ltd., Daejeon (KR)

(72) Inventors: Jun Ho Heo, Daejeon (KR); Seung Wan Yu, Daejeon (KR); Ji Won Lee, Daejeon (KR); Yong Hee Kim, Daejeon (KR); Kwon Chung, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 119 days.

(21) Appl. No.: 17/732,177

(22) Filed: Apr. 28, 2022

(65) Prior Publication Data
US 2022/0351337 A1    Nov. 3, 2022

(30) Foreign Application Priority Data

Apr. 28, 2021 (KR) .......... 10-2021-0055246
Dec. 30, 2021 (KR) .......... 10-2021-0193095

(51) Int. Cl.
| | | |
|---|---|---|
| G06T 15/04 | (2011.01) | |
| G01J 1/42 | (2006.01) | |
| G06T 5/20 | (2006.01) | |
| G06T 5/40 | (2006.01) | |
| G06T 5/70 | (2024.01) | |
| G06T 5/92 | (2024.01) | |

(52) U.S. Cl.
CPC .............. *G06T 5/70* (2024.01); *G01J 1/4204* (2013.01); *G06T 5/20* (2013.01); *G06T 5/40* (2013.01); *G06T 5/92* (2024.01); *G06T 2207/30168* (2013.01)

(58) Field of Classification Search
CPC ........... G06T 5/002; G06T 5/40; G01J 1/4204
See application file for complete search history.

(56) References Cited

U.S. PATENT DOCUMENTS

| | | | | |
|---|---|---|---|---|
| 2014/0140620 | A1* | 5/2014 | Jiyun ................... | G06T 5/002 382/173 |
| 2014/0253807 | A1* | 9/2014 | Ohtani ................. | H04N 1/38 348/607 |
| 2018/0218482 | A1* | 8/2018 | Ganesan .......... | A61B 1/000095 |
| 2020/0372612 | A1* | 11/2020 | Higaki ................ | G06T 5/002 |
| 2022/0341912 | A1* | 10/2022 | Viallat .............. | G01N 15/1459 |

FOREIGN PATENT DOCUMENTS

| | | |
|---|---|---|
| KR | 2008-0095763 A | 10/2008 |
| KR | 2014-0042578 A | 4/2014 |
| KR | 2016-0039083 A | 4/2016 |

OTHER PUBLICATIONS

Purohit et al., Image Processing Framework for Performance Enhancement of Low-Light Image Sensors, IEEE Sensors Journal, vol. 21, No. 6, Mar. 15, 2021, pp. 8530-8542 (Year: 2021).*

* cited by examiner

*Primary Examiner* — Samantha (Yuehan) Wang
(74) *Attorney, Agent, or Firm* — POLSINELLI PC (57) ABSTRACT

The present disclosure discloses an image data processing system, and discloses an image data processing system for a vehicle, which compensates image data by reflecting an ambient illumination.

17 Claims, 9 Drawing Sheets

| a1 | a2 | a3 |
|----|----|----|
| b1 | b2 | b3 |
| c1 | c2 | c3 |

IMAGE DATA PROCESSING SYSTEM FOR VEHICLE

BACKGROUND

1. Technical Field

Various embodiments generally relate to an image data processing system, and more particularly, to an image data processing system for a vehicle, which compensates image data by reflecting an ambient illumination.

2. Related Art

A display system is being adopted in various fields according to the development of technology.

For example, in the case of a vehicle, an instrument panel and a center facia of a dashboard are configured using display panels. If necessary, the instrument panel and the center facia are configured in an integral type.

In the vehicle, an image data processing system including the display panels is configured. The image data processing system may be used to display various information, such as driving information of the vehicle, vehicle state information and safety information, through the display panels.

In general, an image data processing system for a vehicle requires cognitive compensation.

To this end, an image may be processed by applying a frame gain. However, in this case, a function for preventing the noise of an image from increasing may lack.

Alternatively, an image may be processed by applying a function for over or below a specific grayscale using a histogram. However, in this case, as unnatural pixel mapping is performed, the information of an image may be lost or a smooth image change may be limited.

Furthermore, when the intensity of an ambient illumination is equal to or greater than a threshold, the degree of screen cognition that can be compensated for by adjusting the brightness of the screen of a display panel may be limited.

In addition, when calculating an optimal frame gain for an ambient illumination situation, the intensity of an ambient illumination is not considered.

Moreover, when a screen brightness or image data is strongly compensated, there is a problem in that a contrast decreases due to a limitation in the expression of the display panel.

Therefore, in the image data processing system for a vehicle, it is necessary to apply a technology capable of solving the above-described problems.

SUMMARY

Various embodiments are directed to removing only the noise of an image and preventing a blur in the process of processing image data for a vehicle.

Various embodiments are directed to calculating an optimal frame gain in consideration of characteristics of each image and an ambient illumination environment and preventing a clipping phenomenon of a high grayscale.

Various embodiments are directed to compensating for nonlinear cognition impairment by an ambient illumination to keep the difference between grayscales perceived by a user constant.

Various embodiments are directed to darkening the grayscale of a surrounding area while maintaining the type of the main information of an image, thereby minimizing legibility impairment due to an ambient illumination environment.

In an embodiment, an image data processing system for a vehicle may include: an illumination sensor configured to provide an illumination sensing signal by sensing an ambient illumination; an image characteristic analysis unit configured to generate a frame gain point and a roll-off point corresponding to the illumination sensing signal in an input gray by input frame data; a perception difference generation unit configured to generate an output point corresponding to the illumination sensing signal in an output gray by output frame data; and a compensation calculation unit configured to divide the input gray into a plurality of sections by using the frame gain point, the roll-off point and the output point, and output frame data obtained by converting the input frame data to have the output gray corresponding to a change in the input gray by a proportional relationship determined for each section.

In an embodiment, an image data processing system for a vehicle may include: an illumination sensor configured to provide an illumination sensing signal by sensing an ambient illumination; a noise removal unit configured to provide input frame data; and a compensation calculation unit configured to provide frame data obtained by converting the input frame data in response to the illumination sensing signal, wherein the noise removal unit provides the input frame data obtained by compensating a noise pixel value of a noise pixel included in an input frame by using surrounding pixel values of surrounding pixels.

In an embodiment, an image data processing system for a vehicle may include: an illumination sensor configured to provide an illumination sensing signal by sensing an ambient illumination; a compensation calculation unit configured to provide frame data obtained by converting input frame data in response to the illumination sensing signal; and a legibility improvement unit configured to detect a requiring area which requires legibility improvement in the frame data, generate a high-frequency component for the requiring area and, provide output frame data obtained by adding the high-frequency component to the frame data for the requiring area.

In the present disclosure, it is possible to anticipate an effect that only the noise of an image is removed and a blur is prevented in the process of processing image data for a vehicle.

In addition, in the present disclosure, it is possible to anticipate an effect that an optimal frame gain is calculated in consideration of characteristics of each image and an ambient illumination environment and a clipping phenomenon of a high grayscale is prevented.

Furthermore, in the present disclosure, it is possible to anticipate an effect that nonlinear cognition impairment by an ambient illumination is compensated for to keep the difference between grayscales perceived by a user constant.

Moreover, in the present disclosure, it is possible to anticipate an effect that the grayscale of a surrounding area is darkened while the type of the main information of an image is maintained, thereby minimizing legibility impairment due to an ambient illumination environment.

DETAILED DESCRIPTION

The present disclosure is implemented so that an image data processing system for a vehicle may compensate image data by reflecting an ambient illumination.

Figure 1:
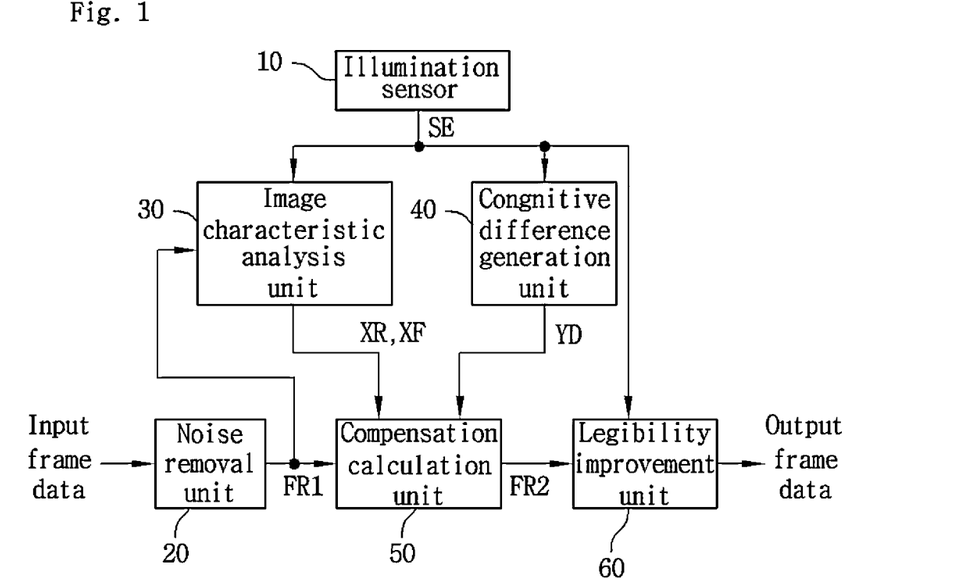
FIG. 1 is a block diagram showing an embodiment of an image data processing system for a vehicle in accordance with the present disclosure.

Referring to FIG. 1, an embodiment of an image data processing system for a vehicle may be configured to include an illumination sensor 10, a noise removal unit 20, an image characteristic analysis unit 30, a cognitive difference generation unit 40, a compensation calculation unit 50 and a legibility improvement unit 60.

In the embodiment of the present disclosure, the noise removal unit 20 may compensate for a noise component existing in input frame data, thereby removing only the noise of an image and preventing a blur.

In more detail, the noise removal unit 20 may be configured to provide input frame data in which a noise pixel value of a noise pixel included in an input frame is compensated for by using surrounding pixel values of surrounding pixels.

To this end, the noise removal unit 20 may select a kernel of a preset size in the input frame data which forms the input frame, and may perform noise detection and removal by applying the kernel to the entire input frame.

Figure 2:
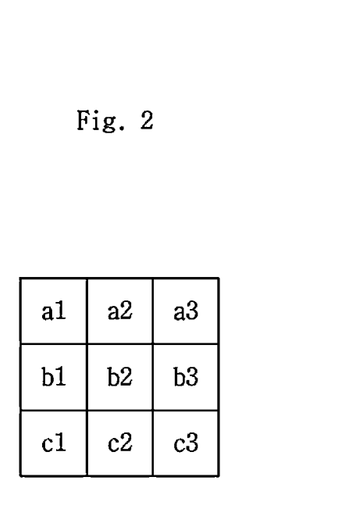
FIG. 2 is a diagram illustrating a kernel for noise removal by a noise removal unit.

The kernel may be exemplified as having a size of 3*3 as illustrated in FIG. 2, and pixels a1, a2, a3, b1, b2, b3, c1, c2 and c3 may be included in the kernel. Among them, the pixel b2 may be understood as a center pixel, and the remaining pixels may be understood as surrounding pixels.

Figure 3:
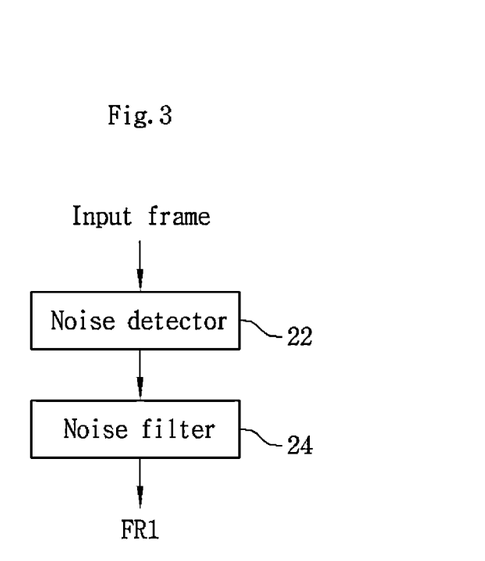
FIG. 3 is a block diagram showing an example of the noise removal unit.

As shown in FIG. 3, the noise removal unit 20 may be configured to include a noise detector 22 and a noise filter 24.

Between them, the noise detector 22 is to detect whether the center pixel b2 corresponds to a noise pixel, by using the center pixel value of the center pixel b2 and the surrounding pixel values of the surrounding pixels a1, a2, a3, b1, b3, c1, c2 and c3 included in the kernel of FIG. 2 selected in the input frame.

The noise filter 24 is to replace the center pixel value of the center pixel b2 corresponding to a noise pixel with a correction pixel value generated using the surrounding pixel values of the surrounding pixels a1, a2, a3, b1, b3, c1, c2 and c3.

Figure 4:
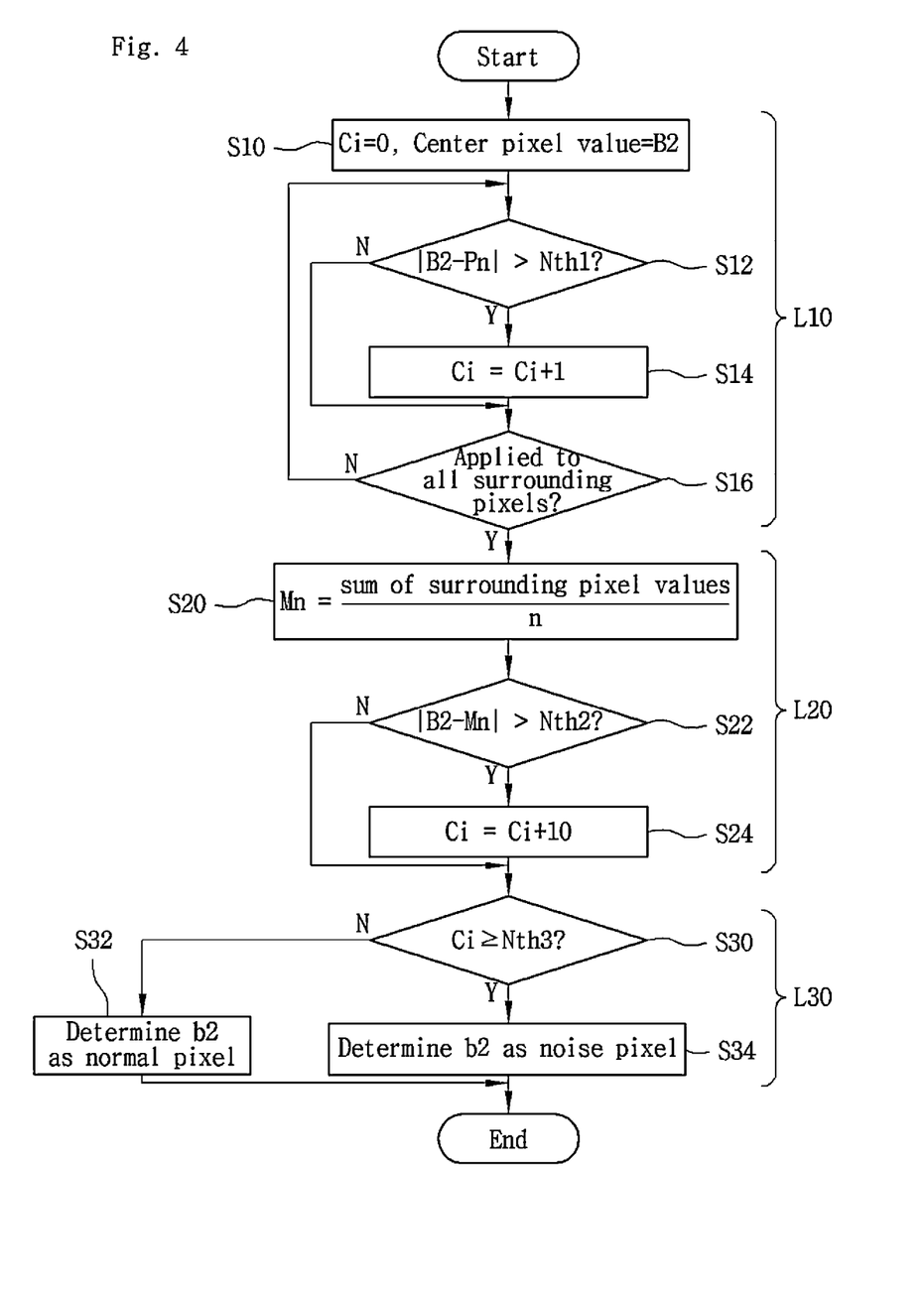
FIG. 4 is a flowchart showing a noise determination method of the noise removal unit.

The noise removal unit 20 may output an input frame PR1 from which noise is removed by a method illustrated in FIG. 4.

In more detail, the noise detector 22 generates a first count value Ci by counting the number of cases in which calculated values corresponding to absolute values of the differences between the center pixel value of the center pixel b2 and surrounding pixel values Pn of the surrounding pixels a1, a2, a3, b1, b3, c1, c2 and c3 are greater than a preset first threshold Nth1 (L10).

The noise detector 22 applies a preset second count value when the absolute value of a difference between the center pixel value of the center pixel b2 and an average Mn of the surrounding pixel values of the surrounding pixels a1, a2, a3, b1, b3, c1, c2 and c3 is greater than a preset second threshold Nth2 (L20).

When a value obtained by summing the first count value Ci and the second count value is equal to or greater than a preset third threshold Nth3, the noise detector 22 may detect a result of determining that the center pixel b2 corresponds to a noise pixel (L30).

The first threshold Nth1, the second threshold Nth2 and the third threshold Nth3 described above may be designated by a fabricator.

A more detailed operation of the noise detector 22 will be described below with reference to FIG. 4.

The noise detector 22 detects noise using the kernel as illustrated in FIG. 2, and at initial step S10, resets the first count value Ci to '0' and reads a center pixel value B2 of the center pixel b2 (S10).

Thereafter, the noise detector 22 determines whether a calculated value corresponding to the absolute value of a difference between the center pixel value B2 of the center pixel b2 and the surrounding pixel value Pn of the surrounding pixel a1 is greater than the first threshold Nth1 (S12). For the sake of convenience in explanation, surrounding pixel values are representatively denoted by Pn.

The noise detector 22 increases the first count value Ci by '1' when a calculated value corresponding to the absolute value of a difference between the center pixel value B2 of the center pixel b2 and the surrounding pixel value Pn of the surrounding pixel a1 is greater than the first threshold Nth1 (S14).

The noise detector 22 generates the first count value Ci by repeating the steps S12 and S14 for all the surrounding pixels a1, a2, a3, b1, b3, c1, c2 and c3 (S16).

For example, the minimum value of the first count value Ci may be "0," and the maximum value of the first count value Ci may be "8."

Thereafter, the noise detector 22 calculates the average Mn of the surrounding pixel values of the surrounding pixels a1, a2, a3, b1, b3, c1, c2 and c3 (S20). The average Mn of the surrounding pixel values may be generated by dividing the sum of the surrounding pixel values of all the surrounding pixels a1, a2, a3, b1, b3, c1, c2 and c3 by the number of the surrounding pixels a1, a2, a3, b1, b3, c1, c2 and c3. Then, the noise detector 22 determines whether the absolute value of a difference between the center pixel value B2 of the center pixel b2 and the average Mn of the surrounding pixel values is greater than the second threshold Nth2 (S22).

For example, the noise detector 22 may apply "10" as the second count value when the absolute value of a difference between the center pixel value B2 of the center pixel b2 and the average Mn of the surrounding pixel values is greater than the second threshold Nth2, and may apply "0" as the second count value in an opposite case.

The noise detector 22 calculates a value obtained by summing the first count value Ci and the second count value "0" or "10" (S24), and determines whether the value obtained by summing the first count value Ci and the second count value "0" or "10" is equal to or greater than the third threshold Nth3 (S30).

Assuming that the third threshold Nth3 is set to "17," the noise detector 22 determines that the center pixel b2 is normal when the value obtained by summing the first count value Ci and the second count value is less than 17 (S32), and determines that the center pixel b2 is a noise pixel when the value obtained by summing the first count value Ci and the second count value is equal to or greater than 17 (S34).

The noise detector 22 may detect whether the center pixel b2 of the kernel of FIG. 2 corresponds to a noise pixel, as described above with reference to FIG. 4.

The center pixel value B2 of the center pixel b2 which is determined as corresponding to a noise pixel, by the noise detector 22, may be replaced with a correction pixel value by the operation of the noise filter 24.

The operation of the noise filter 24 will be described below with reference to FIGS. 5 and 6.

The noise filter 24 generates first calculated values Dn of the surrounding pixels a1, a2, a3, b1, b3, c1, c2 and c3 corresponding to the absolute values of differences between the center pixel value B2 of the center pixel b2 and the surrounding pixel values Pn of all the surrounding pixels a1, a2, a3, b1, b3, c1, c2 and c3 (S40). For the sake of convenience in explanation, a first calculated value for the center pixel value B2 of the center pixel b2 and a surrounding pixel value of each surrounding pixel is representatively denoted by Dn.

Figure 5:
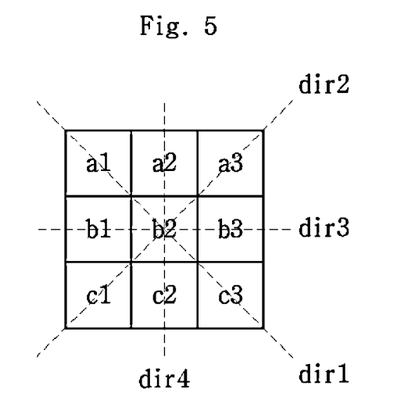
FIG. 5 is a diagram illustrating a kernel for explaining a noise removal method of the noise removal unit.
Figure 6:
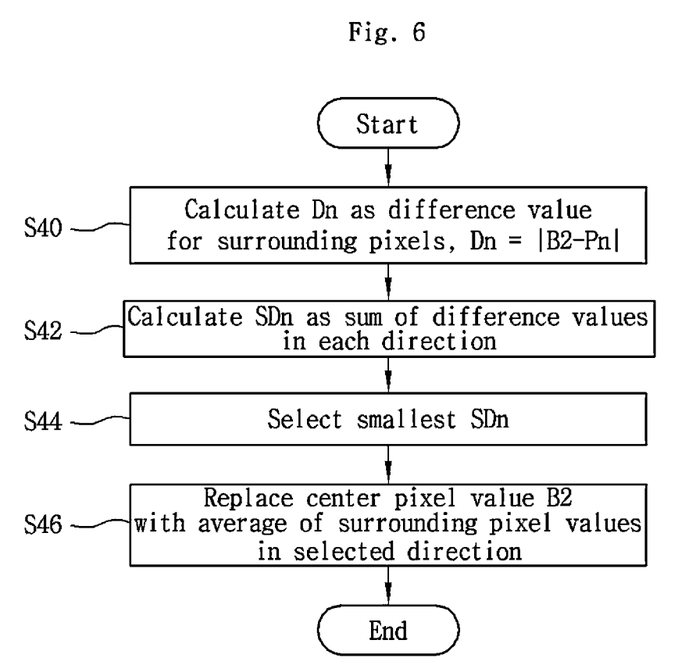
FIG. 6 is a flowchart showing the noise removal method of the noise removal unit.

In detail, the noise filter 24 generates the first calculated values Dn by calculating the absolute values of differences between the center pixel value B2 of the center pixel b2 and the surrounding pixel values Pn of the surrounding pixels a1, a2, a3, b1, b3, c1, c2 and c3 in respective directions dir1, dir2, dir3 and dir4 of FIG. 5. That is to say, for the direction dir1, the first calculated value Dn corresponding to the absolute value of a difference between the center pixel value B2 of the center pixel b2 and the surrounding pixel value Pn of the surrounding pixel a1 may be calculated, and the first calculated value Dn corresponding to the absolute value of a difference between the center pixel value B2 of the center pixel b2 and the surrounding pixel value Pn of the surrounding pixel c3 may be calculated. In addition, the first calculated values Dn may be calculated in the same manner even for the remaining directions dir2, dir3 and dir4.

Thereafter, the noise filter 24 may calculate second calculated values SDn by summing the first calculated values Dn of the surrounding pixels symmetrical about the center pixel b2 in the respective directions dir1, dir2, dir3 and dir4 (S42). In more detail, for the direction dir1, the second calculated value SDn may be calculated by summing the first calculated value Dn corresponding to the absolute value of a difference between the center pixel value B2 of the center pixel b2 and the surrounding pixel value Pn of the surrounding pixel a1 and the first calculated value Dn corresponding to the absolute value of a difference between the center pixel value B2 of the center pixel b2 and the surrounding pixel value Pn of the surrounding pixel c3. In addition, the second calculated values SDn may be calculated in the same manner even for the remaining directions dir2, dir3 and dir4.

Thereafter, the noise filter 24 selects a smallest value among the second calculated values SDn (S44), and uses the average of the surrounding pixel values of surrounding pixels corresponding to the selected second calculated value SDn as a correction pixel value. The noise filter 24 may replace the center pixel value of the center pixel b2 corresponding to a noise pixel with the correction pixel value (S46).

The input frame data in which the center pixel values determined as noise pixels by the noise removal unit 20 are corrected as described above may be transferred to the image characteristic analysis unit 30 and the compensation calculation unit 50 to be described later.

The embodiment of the present disclosure may be configured to calculate an optimal frame gain in consideration of the characteristics of each image and an ambient illumination environment, prevent a clipping phenomenon of a high grayscale, and compensate for nonlinear cognition impairment by the ambient illumination environment so as to keep the difference between grayscales perceived by a user constant.

To this end, the embodiment of the present disclosure may be configured to include the illumination sensor 10 which provides an illumination sensing signal SE by sensing an ambient illumination of a display panel of a vehicle.

The illumination sensor 10 may be configured to provide the illumination sensing signal SE to the image characteristic analysis unit 30 and the cognitive difference generation unit 40.

The image characteristic analysis unit 30 may be configured to generate a frame gain point XF and a roll-off point XR corresponding to the illumination sensing signal SE in an input gray by input frame data FR1 provided from the noise removal unit 20.

The cognitive difference generation unit 40 may be configured to generate an output point YD corresponding to the illumination sensing signal SE in an output gray by output frame data.

Between them, the image characteristic analysis unit 30 will be described below in detail.

The image characteristic analysis unit 30 is to determine compensation according to an illumination and perform compensation adjustment according to the characteristics of an image.

To this end, the image characteristic analysis unit 30 may select an initial clipping proportional value Rf corresponding to the illumination sensing signal SE, may generate a clipping proportional value Rc by adjusting the initial clipping proportional value Rf by referring to the brightness of the input frame data FR1, may output the clipping proportional value Rc adjusted to a frame gain limit RI by comparing the illumination sensing signal SE and a preset frame gain limit, as the frame gain point XF, and may generate and output the roll-off point XR for the frame gain point XF.

It may be understood that a method in which the image characteristic analysis unit 30 generates the frame gain point XF and the roll-off point XR described above is obtained by the method of FIG. 7.

Figure 7:
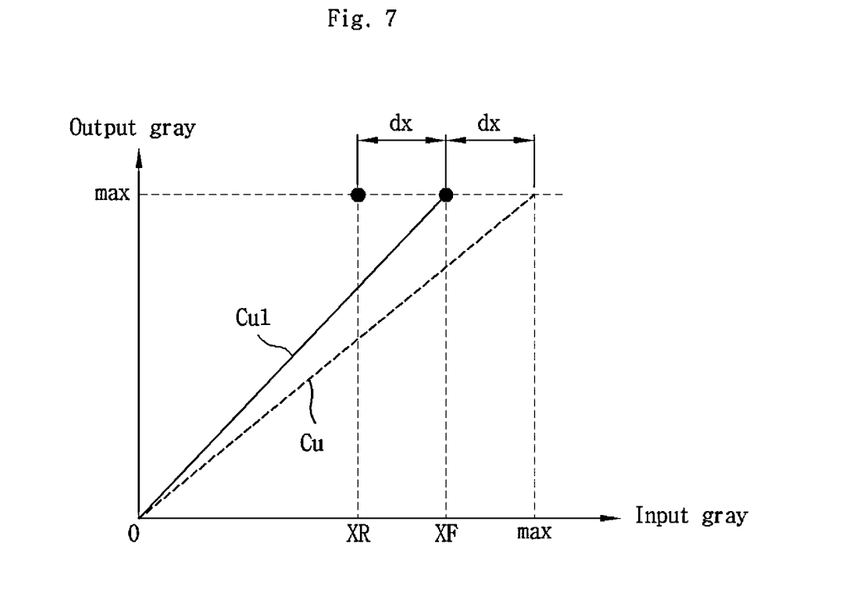
FIG. 7 is a graph for explaining the operation of an image characteristic generation unit.

In FIG. 7, it may be understood that a correlation Cu corresponds to the clipping proportional value Rc obtained by adjusting the initial clipping proportional value Rf by referring to the brightness of the input frame data FR1 and a correlation Cu1 corresponds to the clipping proportional value Rc adjusted to the frame gain limit Rl by comparing a frame gain limit.

In other words, by the initial clipping proportional value Rf corresponding to the illumination sensing signal SE, the clipping proportional value Rc adjusted by referring to the brightness of the input frame data FR1 and the frame gain limit Rl, the correlation Cu between an output gray and an input gray is changed to the correlation Cu1. As the correlation Cu is changed to the correlation Cu1, the frame gain point XF may be obtained. The frame gain point XF may be understood as a point of the input gray corresponding to a maximum output gray.

After the frame gain point XF is obtained, the roll-off point XR may be generated to have a position adjusted from the frame gain point XF on the input gray by an amount by which the clipping proportional value Rc is adjusted by the frame gain limit Rl.

Figure 8:
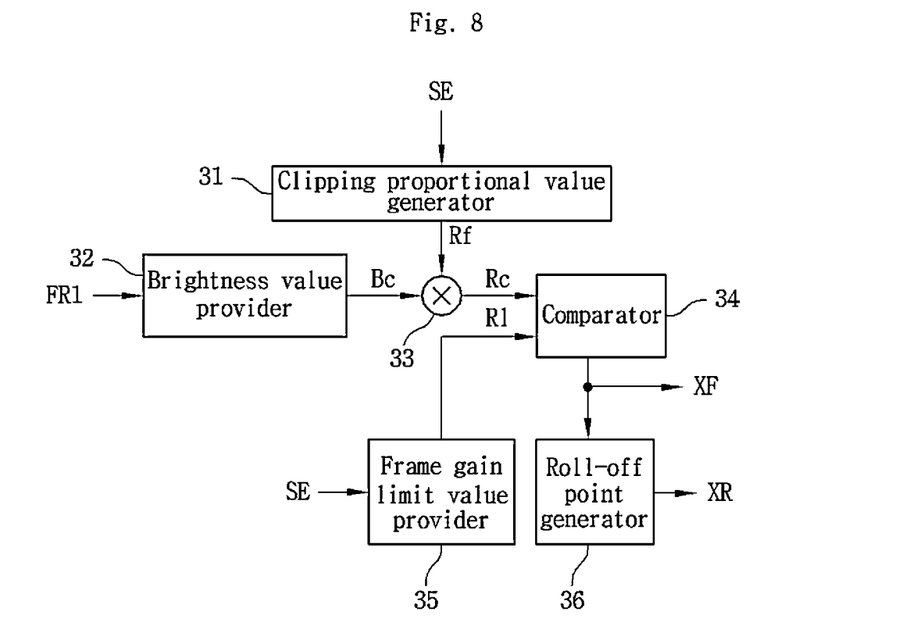
FIG. 8 is a block diagram illustrating an example of the image characteristic generation unit.

For the above operation, the image characteristic analysis unit 30 may include a clipping proportional value generator 31, a brightness value provider 32, a comparator 34, a frame gain limit value provider 35 and a roll-off point generator 36.

The clipping proportional value generator 31 is configured to select and output the initial clipping proportional value Rf corresponding to the illumination sensing signal SE.

Figure 9:
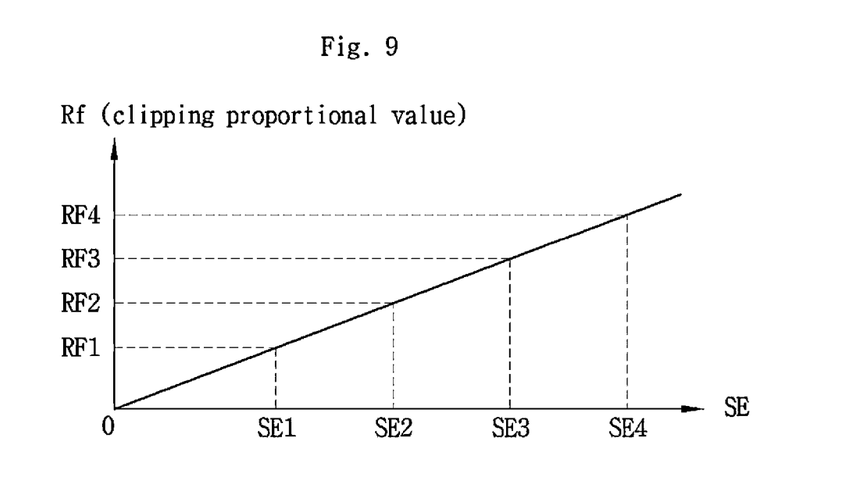
FIG. 9 is a graph for explaining the providing of an initial clipping proportional value.

In more detail, the clipping proportional value generator 31 may be described with reference to FIG. 9.

The clipping proportional value generator 31 may receive the illumination sensing signal SE, and may store in advance reference initial clipping proportional values (e.g., RF1, RF2, RF3 and RF4) corresponding to a plurality of reference illumination sensing signals, for example, SE1, SE2, SE3 and SE4, of different levels.

The clipping proportional value generator 31 finds a reference initial clipping proportional value corresponding to the illumination sensing signal SE.

When the reference initial clipping proportional value corresponding to the illumination sensing signal SE is stored, the clipping proportional value generator 31 is configured to output the corresponding reference initial clipping proportional value as the initial clipping proportional value Rf, and when there is no corresponding reference initial clipping proportional value, the clipping proportional value generator 31 is configured to output the initial clipping proportional value Rf generated by interpolation. It may be understood that the interpolation is performed by a general method of obtaining the initial clipping proportional value Rf to be outputted, by using adjacent reference initial clipping proportional values.

The brightness value provider 32 is configured to provide an adjustment value Bc corresponding to a brightness on the basis of the histogram of the input frame data FR1.

A calculator 33 is configured to generate the clipping proportional value Rc obtained by adjusting the initial clipping proportional value Rf of the clipping proportional value generator 31 by the adjustment value Bc of the brightness value provider 32. The calculator 33 may be configured using a multiplier.

The frame gain limit value provider 35 is configured to provide a preset frame gain limit for the illumination sensing signal SE.

Figure 10:
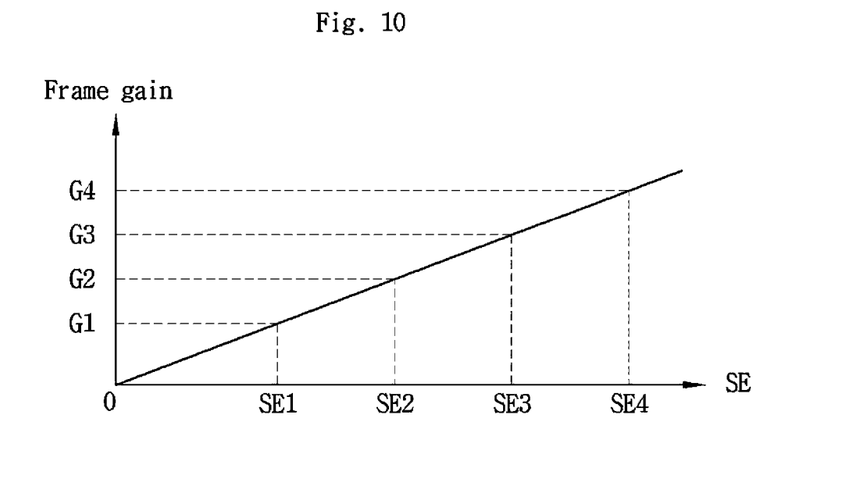
FIG. 10 is a graph for explaining the providing of a frame gain limit.

As shown in FIG. 10, the frame gain limit value provider 35 may receive the illumination sensing signal SE, and may store in advance reference frame gain limits (e.g., G1, G2, G3 and G4) corresponding to the plurality of reference illumination sensing signals, for example, SE1, SE2, SE3 and SE4, of different levels.

The frame gain limit value provider 35 finds a reference frame gain limit corresponding to the illumination sensing signal SE.

When the reference frame gain limit corresponding to the illumination sensing signal SE is stored, the frame gain limit value provider 35 is configured to output the corresponding reference frame gain limit as the frame gain limit Rl, and when there is no corresponding reference frame gain limit, the frame gain limit value provider 35 is configured to output the frame gain limit Rl generated by interpolation. It may be understood that the interpolation is performed by a general method of obtaining a frame gain limit to be outputted, by using adjacent reference frame gain limits.

The comparator 34 compares the clipping proportional value Rc provided from the calculator 33 and the frame gain limit Rl provided from the frame gain limit value provider 35 to output a clipping proportional value adjusted by the frame gain limit Rl, as the frame gain point XF.

The roll-off point generator 36 is configured to generate and output the roll-off point XR for the adjusted frame gain point XF, as described above with reference to FIG. 7.

In more detail, the roll-off point generator 36 may generate the roll-off point XR to have a position adjusted from the frame gain point XF on the input gray by an amount by which the clipping proportional value Rc provided by the calculator 33 is adjusted by the frame gain limit Rl.

The image characteristic analysis unit 30 may provide the frame gain point XF and the roll-off point XR on the input gray as described above. Therefore, the embodiment of the present disclosure may calculate an optimal frame gain in consideration of the characteristics of each image and an ambient illumination environment, and may prevent a clipping phenomenon of a high grayscale.

The cognitive difference generation unit 40 is configured to generate the output point YD corresponding to the illumination sensing signal SE in the output gray by the output frame data.

Figure 11:
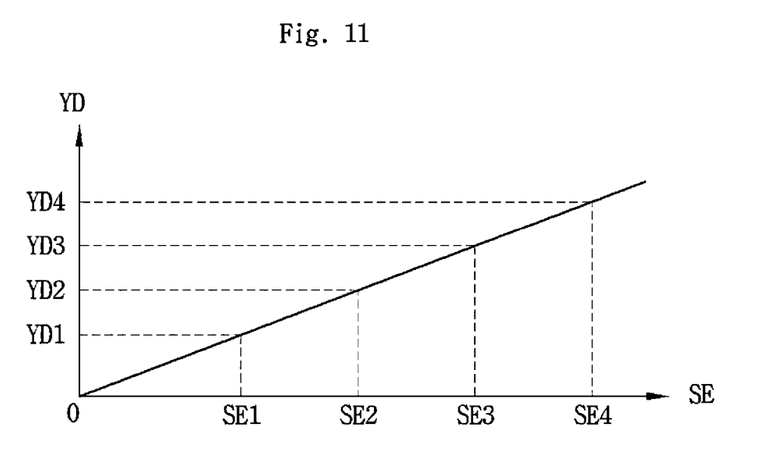
FIG. 11 is a graph for explaining a cognitive difference according to an illumination.

The cognitive difference generation unit 40 may receive the illumination sensing signal SE, and may store in advance reference output points, for example, YD1, YD2, YD3 and YD4, corresponding to the plurality of reference illumination sensing signals, for example, SE1, SE2, SE3 and SE4, of different levels.

The cognitive difference generation unit 40 finds an output point on the output gray corresponding to the illumination sensing signal SE.

Figure 12:
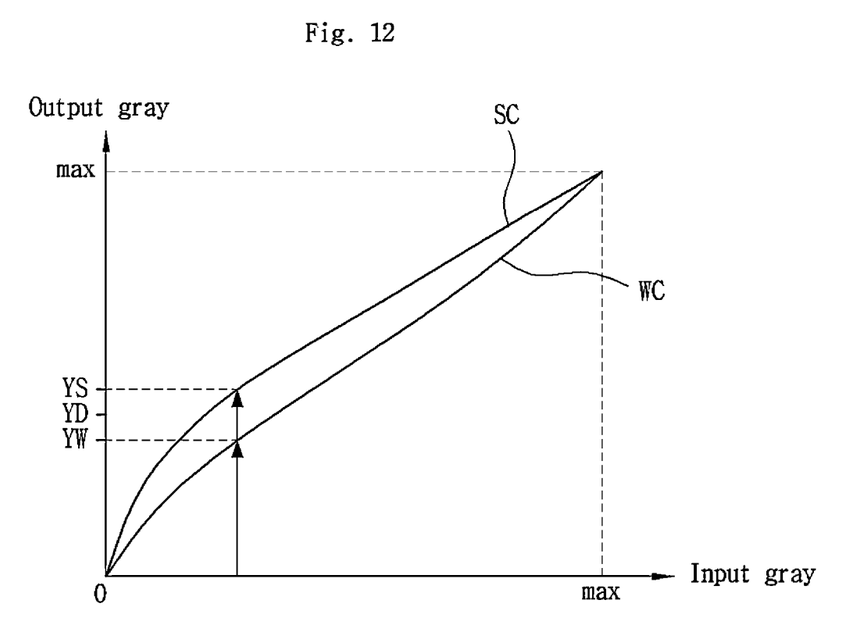
FIG. 12 is a graph for explaining the setting of an output point according to a cognitive difference for each grayscale.

A value for compensating for a cognitive difference may be differently changed according to an ambient illumination for each grayscale. In FIG. 12, SC denotes a curve which indicates a compensation value for a cognitive difference according to a strong illumination, and WC denotes a curve which indicates a compensation value (e.g., YW) for a cognitive difference according to a weak illumination.

When a reference output point corresponding to the illumination sensing signal SE is stored, the cognitive difference generation unit 40 is configured to output the corresponding reference output point as the output point YD, and when there is no corresponding reference output point, the cognitive difference generation unit 40 is configured to output the output point YD generated by interpolation. It may be understood that the interpolation is performed by a general method of obtaining an output point to be outputted, by using adjacent reference output points.

The embodiment of the present disclosure may compensate for nonlinear cognition impairment by an ambient illumination through the above-described operation of the cognitive difference generation unit 40 to keep the difference between grayscales perceived by a user constant.

The compensation calculation unit 50 is configured to provide frame data obtained by converting the input frame data in correspondence to the illumination sensing signal SE.

Figure 13:
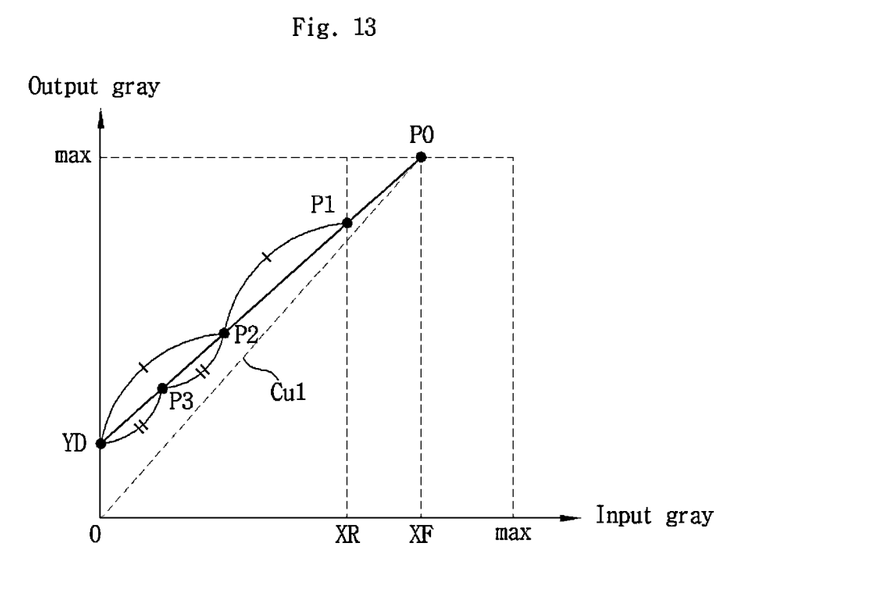
FIGS. 13 and 14 are graphs for explaining a method of generating a nonlinear curve for reducing a cognitive difference by a compensation calculation unit.

In more detail, the compensation calculation unit 50 is configured to divide the input gray into a plurality of sections as shown in FIG. 13 by using the frame gain point XF and the roll-off point XR for the input gray and the output point YD for the output gray, and to output frame data FR2 obtained by converting the input frame data so as to have the output gray in correspondence to a change in the input gray according to a proportional relationship determined for each section.

To this end, the compensation calculation unit 50 sets, in a rectangular coordinate system having a first axis for the output gray and a second axis for the input gray as shown in FIG. 13, second to fourth points P1 to P3 on a straight line among the output point YD on the output gray, the frame gain point XF of the input gray and a first point P0 corresponding to a maximum value of the output gray.

The second point P1 may be set to correspond to the roll-off point XR of the input gray on a straight line between the first point P0 and the output point YD.

The third point P2 may be set to correspond to the middle between the second point P1 and the output point YD on the straight line between the first point P0 and the output point YD.

The fourth point P3 may be set to correspond to the middle between the third point P2 and the output point YD on the straight line between the first point P0 and the output point YD.

Figure 14:
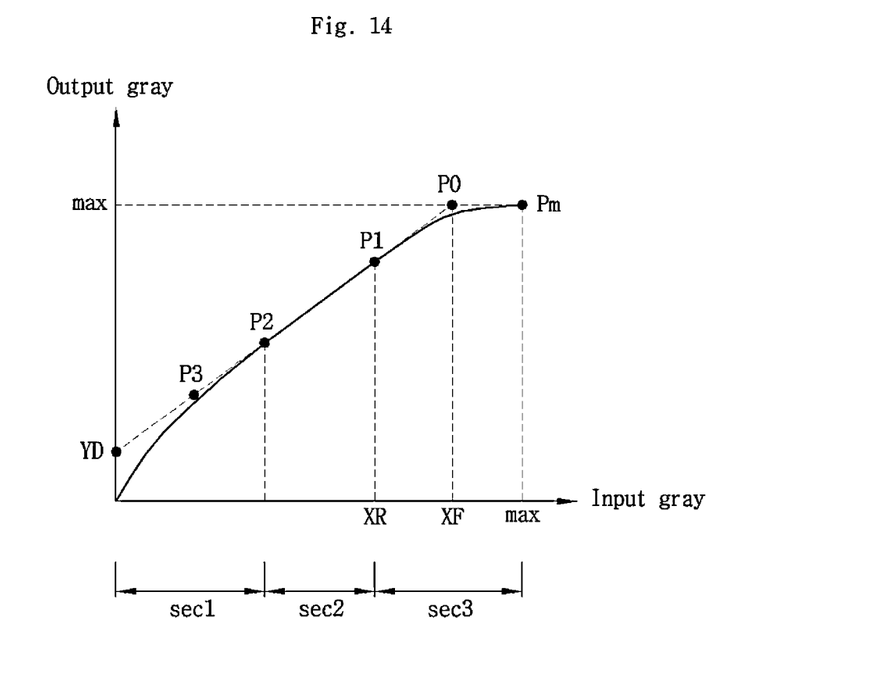

As shown in FIG. 14, the compensation calculation unit 50 may divide the input gray into a first section sec1 between the reference point of the rectangular coordinate system and the third point P2, a second section sec2 between the third point P2 and the second point P1, and a third section sec3 between the second point P1 and a maximum point Pm. It may be understood that the maximum point Pm corresponds to the maximum value of the input gray and the maximum value of the output gray.

The compensation calculation unit 50 may be configured to match the output gray to the input gray by using a Bezier curve formed using the points P3 and P1 in the first section sec1 and the third section sec3.

The compensation calculation unit 50 may be configured to match the output gray to the input gray by a one-dimensional proportional relationship in the second section sec2.

The legibility improvement unit 60 may be configured to detect a requiring area which requires legibility improvement in the frame data FR2 provided by the compensation calculation unit 50, to generate a high-frequency component for the requiring area and, to provide the output frame data obtained by adding the high-frequency component to frame data for the requiring area.

Figure 15:
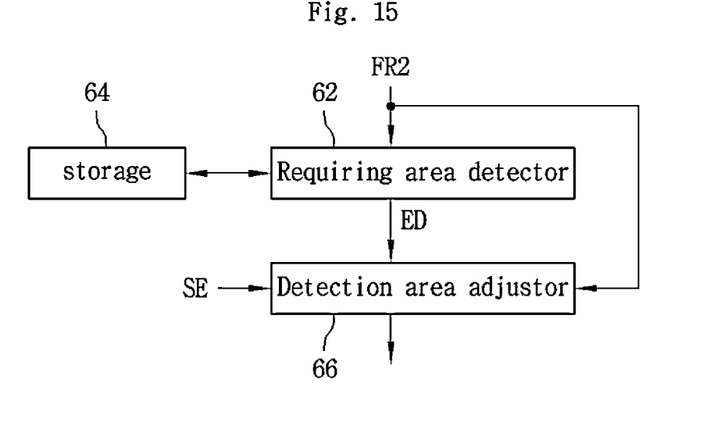
FIG. 15 is a block diagram illustrating an example of a legibility improvement unit.

To this end, as shown in FIG. 15, the legibility improvement unit 60 may include a requiring area detector 62, a storage 64 and a detection area adjustor 66.

The storage 64 may store sampling kernels Ma to Mn (see FIG. 17) which are stored in advance. For example, the sampling kernels Ma to Mn may have a size of 3*3 in which the center pixel C is the center.

Figure 16:
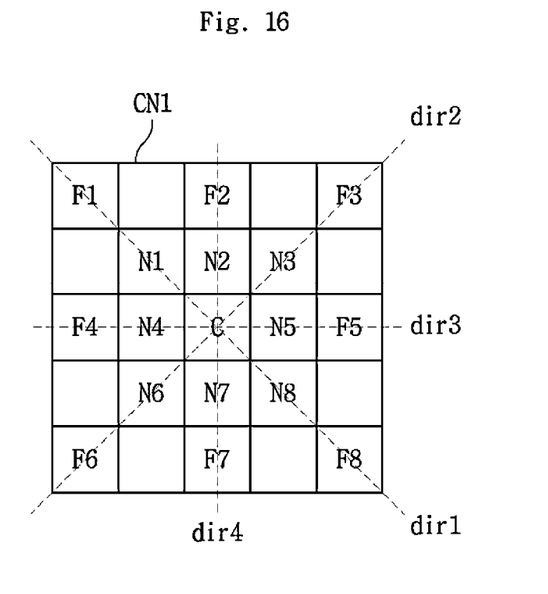
FIG. 16 is a diagram illustrating a test kernel.
Figure 17:
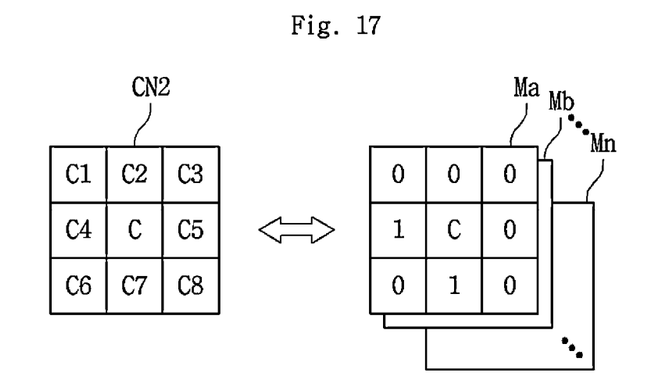
FIG. 17 is a diagram illustrating a comparison kernel and a sampling kernel.

The requiring area detector 62 is configured to extract a test kernel CN1 of FIG. 16 from the frame data FR2, generate a comparison kernel CN2 in which determination patterns C1 to C8 are disposed in correspondence to directions where near pixels N1 to N8 are positioned about the center pixel C, and detect the test kernel CN1 as a requiring area requiring legibility improvement when a sampling kernel corresponding to the comparison kernel CN2 exists.

In more detail, the requiring area detector 62 may extract the test kernel CN1 of FIG. 16 which includes the center pixel C, the near pixels N1 to N8 surrounding the center pixel C and far pixels surrounding the near pixels N1 to N8, from the frame data FR2. The test kernel CN1 may have a size of 5*5 in which the center pixel C is the center.

The requiring area detector 62 generates the comparison kernel CN2 of FIG. 17 which has determination patterns obtained by determining the center pixel value of the center pixel C on the basis of the near pixel values of the near pixels N1 to N8 and the far pixel values of the far pixels F1 to F8.

In more detail, the requiring area detector 62 generates a determination pattern corresponding to a first comparison result between the center pixel value of the center pixel C and each near pixel value and a second comparison result between the center pixel value of the center pixel C and the far pixel value of each of the far pixels F1 to F8, in each of directions dir1 to dir4 where the near pixels N1 to N8 are positioned with respect to the center pixel C on the test kernel CN1.

The determination pattern may be obtained by the following method.

The requiring area detector 62 may generate the first comparison result by comparing the first absolute value of a difference between the center pixel value of the center pixel C and each of the near pixel values of the near pixels N1 to N8 with a preset first threshold, and may generate the second comparison result by comparing the second absolute value of a difference between the center pixel value of the center pixel C and each of the far pixel values of the far pixels F1 to F8 with a preset second threshold.

The requiring area detector 62 may generate a determination pattern which marks the requirement of legibility improvement when the first absolute value of a difference between the center pixel value of the center pixel C and each of the near pixel values of the near pixels N1 to N8 is equal to or greater than the first threshold and the second absolute value of a difference between the center pixel value of the center pixel C and each of the far pixel values of the far pixels F1 to F8 is equal to or greater than the second threshold.

It may be understood that the determination pattern corresponds to each of C1 to C8 of the comparison kernel CN2 of FIG. 17. For example, the determination pattern may have a value marked as "0" or "1."

Namely, the comparison kernel CN2 may be generated by disposing determination patterns in each of directions where the near pixels N1 to N8 are positioned about the center pixel C. In the same manner as the sampling kernels Ma to Mn, the comparison kernel CN2 may have a size of 3*3 in which the center pixel C is the center.

As shown in FIG. 17, the requiring area detector 62 may determine whether there is a sampling kernel corresponding to the comparison kernel CN2 among the sampling kernels Ma to Mn stored in the storage 64, and when there is a sampling kernel corresponding to the comparison kernel CN2 among the stored sampling kernels Ma to Mn, may detect the test kernel CN1 as a requiring area which requires legibility improvement.

The requiring area detector 62 may be configured to generate a detection signal ED when the test kernel CN1 extracted from the frame data FR2 corresponds to a requiring area according to the operation of the requiring area detector 62, and the detection area adjustor 66 may be configured to provide the output frame data which is obtained by adding a high-frequency component to the frame data in response to the detection signal ED.

To this end, the detection area adjustor 66 may generate a difference between smoothed frame data obtained by changing the resolution of the frame data FR2 to be low and the frame data FR2, as a high-frequency component, may change the high-frequency component to a scale corresponding to the illumination sensing signal SE, and may provide the output frame data which is obtained by adding the scale-changed high-frequency component to the frame data FR2.

Figure 18:
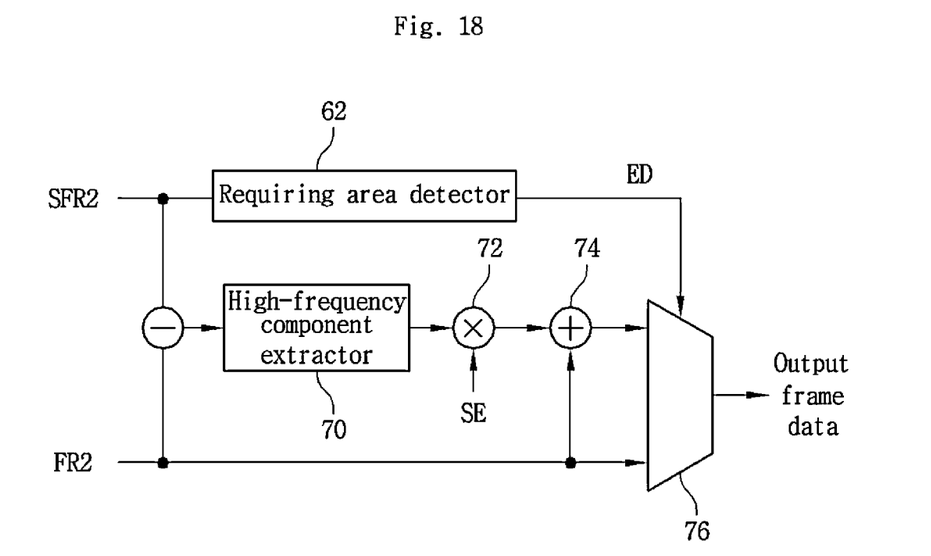
FIG. 18 is a block diagram illustrating a detection area adjuster.

In more detail, the detection area adjustor 66 of the legibility improvement unit 60 may be configured to include a high-frequency component extractor 70, a scaler 72, a calculator 74 and a selector 76. The legibility improvement unit 60 may be configured to use the detection signal ED of the requiring area detector 62 in the selector 76.

In the above configuration, the high-frequency component extractor 70 may be configured to generate a difference between smoothed frame data SFR2 and the frame data FR2 as a high-frequency component. It may be understood that the high-frequency component corresponds to an edge. The intensity of shading for forming a smoothed frame may be adjusted according to a grayscale.

It may be regarded that the scaler 72, which changes the output of the high-frequency component extractor 70 to a scale corresponding to the illumination sensing signal SE, realizes a function for more clearly expressing an edge.

The calculator 74 may be configured to provide the output frame data by adding the scale-changed high-frequency component to the frame data FR2.

The selector 76 is configured to, in response to the detection signal ED of the requiring area detector 62, output the frame data FR2 as the output frame data as it is in the case of the frame data FR2 not requiring legibility improvement, and provide the output of the calculator 74 as the output frame data in the case of the frame data FR2 requiring legibility improvement.

Accordingly, in the embodiment of the present disclosure, it is possible to anticipate an effect that the grayscale of a surrounding area is changed (for example, darkened) while the type of the main information of an image is maintained, thereby minimizing legibility impairment due to an ambient illumination environment.

What is claimed is:

1. An image data processing system for a vehicle, comprising:
   an illumination sensor configured to provide an illumination sensing signal by sensing an ambient illumination;
   an image characteristic analysis unit configured to receive the illumination sensing signal from the illumination sensor and generate a frame gain point and a roll-off point corresponding to the illumination sensing signal in an input gray by input frame data;
   a cognitive difference generation unit configured to receive the illumination sensing signal from the illumination sensor and generate an output point corresponding to the illumination sensing signal in an output gray by output frame data;
   a compensation calculation unit configured to receive the frame gain point and the roll-off point from the image characteristic analysis unit and the output point from the a cognitive difference generation unit, divide the input gray into a plurality of sections by using the frame gain point, the roll-off point and the output point, and output frame data obtained by converting the input frame data to have the output gray corresponding to a change in the input gray by a proportional relationship determined for each section; and
   a noise removal unit configured to receive the input frame data, and provide the input frame data, which are obtained by compensating a noise pixel value of a noise pixel included in an input frame by using surrounding pixel values of surrounding pixels, to the image characteristic analysis unit and the compensation calculation unit,
   wherein the noise removal unit comprises:
   a noise detector configured to detect, by using a center pixel value of a center pixel and the surrounding pixel values of the surrounding pixels included in a kernel of a preset size in the input frame data received by the noise removal unit, whether the center pixel corresponds to the noise pixel; and
   a noise filter configured to replace the center pixel value of the center pixel corresponding to the noise pixel detected by the noise detector with a correction pixel value generated using the surrounding pixel values of the surrounding pixels.

2. The image data processing system according to claim 1, wherein the noise detector
   generates a first count value by counting the number of cases in which calculated values corresponding to absolute values of differences between the center pixel value and the surrounding pixel values are greater than a preset first threshold,
   generates a preset second count value when an absolute value of a difference between the center pixel value and an average of the surrounding pixel values is greater than a preset second threshold, and
   detects that the center pixel corresponds to the noise pixel, when a value obtained by summing the first count value and the second count value is equal to or greater than a preset third threshold.

3. The image data processing system according to claim 1, wherein the noise filter
   generates first calculated values of the surrounding pixels corresponding to absolute values of differences between the center pixel value and the surrounding pixel values,
   calculates second calculated values by summing the first calculated values of the surrounding pixels symmetrical about the center pixel in a plurality of directions,
   selects a smallest value among the second calculated values,
   uses an average of the surrounding pixel values of the surrounding pixels corresponding to the selected second calculated value as the correction pixel value, and
   replaces the center pixel value of the center pixel corresponding to the noise pixel with the correction pixel value.

4. The image data processing system according to claim 1, wherein the noise removal unit uses the kernel of a size of 3*3.

5. The image data processing system according to claim 1, wherein the image characteristic analysis unit
   selects an initial clipping proportional value corresponding to the illumination sensing signal, generates a clipping proportional value by adjusting the initial clipping proportional value by referring to a brightness of the input frame data, outputs the clipping proportional value adjusted to a frame gain limit by comparing the illumination sensing signal and a preset frame gain limit, as the frame gain point, and generates and outputs the roll-off point for the frame gain point.

6. The image data processing system according to claim 1, wherein the cognitive difference generation unit stores in advance reference output points corresponding to the plurality of reference illumination sensing signals of different levels, and generates the output point by interpolation of the reference output points corresponding to the reference illumination sensing signals adjacent to the illumination sensing signal.

7. The image data processing system according to claim 1, wherein the compensation calculation unit, in a rectangular coordinate system having a first axis for the output gray and a second axis for the input gray, sets second to fourth points on a straight line among the output point on the output gray, the frame gain point of the input gray and a first point corresponding to a maximum value of the output gray, sets the second point to correspond to the roll-off point of the input gray on the straight line, sets the third point to correspond to a middle between the second point and the output point on the straight line, sets the fourth point to correspond to a middle between the third point and the output point on the straight line, and divides the input gray into a first section between a reference point of the rectangular coordinate system and the third point, a second section between the third point and the second point, and a third section between the second point and a maximum point, and wherein the maximum point corresponds to a maximum value of the input gray and a maximum value of the output gray.

8. The image data processing system according to claim 7, wherein the compensation calculation unit matches the output gray to the input gray by using a Bezier curve in the first section and the third section.

9. The image data processing system according to claim 7, wherein the compensation calculation unit matches the output gray to the input gray by a one-dimensional proportional relationship in the second section.

10. An image data processing system for a vehicle, comprising:

an illumination sensor configured to provide an illumination sensing signal by sensing an ambient illumination;

an image characteristic analysis unit configured to receive the illumination sensing signal from the illumination sensor and generate a frame gain point and a roll-off point corresponding to the illumination sensing signal in an input gray by input frame data;

a cognitive difference generation unit configured to receive the illumination sensing signal from the illumination sensor and generate an output point corresponding to the illumination sensing signal in an output gray by output frame data; and a compensation calculation unit configured to receive the frame gain point and the roll-off point from the image characteristic analysis unit and the output point from the a cognitive difference generation unit, divide the input gray into a plurality of sections by using the frame gain point, the roll-off point and the output point, and output frame data obtained by converting the input frame data to have the output gray corresponding to a change in the input gray by a proportional determined for each section, wherein the image characteristic analysis unit comprises:

a clipping proportional value generator configured to select and output the initial clipping proportional value corresponding to the illumination sensing signal;

a brightness value provider configured to provide an adjustment value corresponding to a brightness on the basis of a histogram of the input frame data;

a calculator configured to generate the clipping proportional value obtained by adjusting the initial clipping proportional value by the adjustment value;

a frame gain limit value provider configured to provide the preset frame gain limit for the illumination sensing signal;

a comparator configured to compare the clipping proportional value and the frame gain limit to output a clipping proportional value adjusted by the frame gain limit, as the frame gain point; and a roll-off point generator configured to generate and output the roll-off point for the adjusted frame gain point.

11. The image data processing system according to claim 10, wherein the clipping proportional value generator stores in advance reference initial clipping proportional values corresponding to a plurality of reference illumination sensing signals of different levels, and provides the initial clipping proportional value by interpolation of the reference initial clipping proportional values corresponding to the reference illumination sensing signals adjacent to the illumination sensing signal.

12. The image data processing system according to claim 10, wherein the frame gain limit value provider stores in advance reference frame gain limits corresponding to the plurality of reference illumination sensing signals of different levels, and provides the frame gain limit by interpolation of the reference frame gain limits corresponding to the reference illumination sensing signals adjacent to the illumination sensing signal.

13. The image data processing system according to claim 10, wherein the roll-off point generator generates the roll-off point to have a position adjusted from the frame gain point on the input gray by an amount by which the clipping proportional value is adjusted by the frame gain limit.

14. An image data processing system for a vehicle, comprising:

an illumination sensor configured to provide an illumination sensing signal by sensing an ambient illumination;

a noise removal unit configured to receive input frame data and provide the input frame data obtained by compensating a noise pixel value of a noise pixel included in an input frame by using surrounding pixel values of surrounding pixels; and a compensation calculation unit configured to receive the illumination sensing signal from the illumination sensor and provide frame data obtained by converting the input frame data received through the noise removal unit in response to the illumination sensing signal, wherein the noise removal unit comprises:

a noise detector configured to detect, by using a center pixel value of a center pixel and the surrounding pixel values of the surrounding pixels included in a kernel of a preset size in the input frame data received by the noise removal unit, whether the center pixel corresponds to the noise pixel; and a noise filter configured to replace the center pixel value of the center pixel corresponding to the noise pixel detected by the noise detector with a correction pixel value generated using the surrounding pixel values of the surrounding pixels.

15. The image data processing system according to claim 14, wherein the noise detector
generates a first count value by counting the number of cases in which calculated values corresponding to absolute values of differences between the center pixel value and the surrounding pixel values are greater than a preset first threshold,
generates a preset second count value when an absolute value of a difference between the center pixel value and an average of the surrounding pixel values is greater than a preset second threshold, and
detects that the center pixel corresponds to the noise pixel, when a value obtained by summing the first count value and the second count value is equal to or greater than a preset third threshold.

16. The image data processing system according to claim 14, wherein the noise filter
generates first calculated values of the surrounding pixels corresponding to absolute values of differences between the center pixel value and the surrounding pixel values,
calculates second calculated values by summing the first calculated values of the surrounding pixels symmetrical about the center pixel in a plurality of directions,
selects a smallest value among the second calculated values,
uses an average of the surrounding pixel values of the surrounding pixels corresponding to the selected second calculated value as the correction pixel value, and
replaces the center pixel value of the center pixel corresponding to the noise pixel with the correction pixel value.

17. The image data processing system according to claim 14, wherein the noise removal unit uses the kernel of a size of 3*3.

* * * * *